United States Patent
Hainbach

(10) Patent No.: US 6,623,840 B2
(45) Date of Patent: Sep. 23, 2003

(54) PROTECTIVE FLOORING

(75) Inventor: Dirk Hainbach, Lancaster, PA (US)

(73) Assignee: Dodge-Regupol, Incorporated, Lancaster, PA (US)

( * ) Notice: Subject to any disclaimer, the term of this patent is extended or adjusted under 35 U.S.C. 154(b) by 91 days.

(21) Appl. No.: 09/792,363

(22) Filed: Feb. 23, 2001

(65) Prior Publication Data

US 2002/0119291 A1 Aug. 29, 2002

(51) Int. Cl.$^7$ ................................................. B32B 3/00
(52) U.S. Cl. ........................ 428/172; 428/161; 428/218; 428/493
(58) Field of Search ............................... 428/161, 165, 428/172, 218, 493; 5/417, 420

(56) References Cited

U.S. PATENT DOCUMENTS

| | | | |
|---|---|---|---|
| 2,940,887 A | * 6/1960 | Daly et al. | 428/493 |
| 3,446,122 A | 5/1969 | Raichle et al. | 94/7 |
| 3,801,421 A | 4/1974 | Allen et al. | 161/67 |
| 3,978,263 A | 8/1976 | Wellensiek | 428/306 |
| 4,082,888 A | 4/1978 | Portin | 428/327 |
| 4,112,176 A | 9/1978 | Bailey | 428/304 |
| 4,243,696 A | 1/1981 | Toth | 427/27 |
| 4,565,310 A | 1/1986 | Thelen et al. | 404/31 |
| 4,600,639 A | * 7/1986 | Berlemont | 428/493 |
| 4,810,560 A | 3/1989 | Sell | 428/192 |
| 5,221,702 A | 6/1993 | Richards | 524/59 |
| 5,367,007 A | 11/1994 | Richards | 524/59 |
| 5,470,173 A | 11/1995 | Schmidt | 404/32 |
| 5,587,234 A | 12/1996 | Kiser | 428/327 |
| 5,645,914 A | * 7/1997 | Horowitz | 428/81 |
| 5,714,219 A | 2/1998 | Mashunkashey et al. | 428/36.1 |
| 5,714,263 A | 2/1998 | Jakubisin et al. | 428/407 |

OTHER PUBLICATIONS

Websters Dictionary, 10th edition, p. 658, 1996.*
Brochure—Xtreme recycled rubber.
Brochure—Dodge Cork Tile.
Brochure—Cork.
Brochure—Pavesafe.
Brochure—Regupol Multipurpose Sports Flooring.
Brochure—"The unique Regupol dual–durometer track & field surface system combines the . . . ".
Brochure—Fitness Flooring Buyer's Guide.
Brochure—Sports Surfacing that Can't be Beat!.

* cited by examiner

Primary Examiner—Donald J. Loney
(74) Attorney, Agent, or Firm—Barley Snyder

(57) ABSTRACT

A protective flooring tile, and method of manufacturing the same, having a durable and water resistant prefabricated top layer which is made of rubber material. The top layer has a top surface and a bottom surface, with the bottom surface having voids which extend from bottom surface toward the top surface. A resilient bottom layer extends from the top surface and is made of granulated rubber. The bottom layer has a prepolymer material provided between the granulated rubber which bonds the granulated rubber together. The prepolymer material flows from the bottom layer into the voids of the top layer during the manufacture of the protective flooring tile to bond the top layer to the bottom layer.

16 Claims, 5 Drawing Sheets

PROTECTIVE FLOORING

FIELD OF THE INVENTION

This invention relates generally to synthetic ground coverings. In particular, the invention is directed to the use of rubber combined with prepolymeric binders which are used for protective ground coverings in such areas as fitness rooms, playgrounds, factories and the like.

BACKGROUND OF THE INVENTION

There are many situations in which hard flooring is not beneficial to the human body. In areas of high traffic, hard floors can cause various ailments such as bad knees and the like. On factory floors and other areas in which people must stand, hard floors can cause back and other problems. In fitness rooms and physical therapy facilities, the use of hard floors is also minimized to prevent injury. Playgrounds are a prime example of where injuries can be caused by contact with hard surfaces. As people continue to exercise and children continue to play, the chance of injury caused by contact with a hard floor or ground surface continues to increase. In order to minimize the risk of injury, protective ground covering has been introduced in areas such as playgrounds, weight rooms, jogging tracks, exercise rooms, factory floors, etc. These protective floorings can come in various shapes and use various materials. Unconsolidated loose fill materials such as sand, sawdust, and wood chips are in widespread use in several of these fall or impact zones. Rubber flooring is another alternative to minimize impact. The rubber flooring can be used in all of the environments described above. Examples of such flooring for playgrounds are sold and marketed by Dodge-Regupol, Inc. under the Playbound, Playguard and FX Tile brand names. Examples of such flooring for exercise facilities and the like include Everoll, Everlast and ECO tiles also marketed and sold by Dodge-Regupol, Inc. These floors generally consist of a top layer or wear surface and a backing layer that provides the cushioning and shock absorption characteristics required for the particular application.

While these types of rubber floorings are effective for providing cushioning and protecting against injury from impact, current products offered in the market have various limitations. The material and the manufacturing process used limits the applicability of the rubber flooring in various environments. In environments in which liquids may be spilled, such as restaurants, the use of porous surfaces allows the penetration of the liquid into the tile, which can result in damage to the tile. Therefore, it would be beneficial to provide a rubber tile and process of manufacture resulting in a tile having a top layer that is less porous. Also, the products currently used for protective flooring are limited in their aesthetic nature by the limitation of color and patterns available. Due to the materials used and the process of manufacture, the options relating to appearance are severely limited, thereby making the use of rubber flooring less appealing to potential customers. It would, therefore, be advantageous to provide flooring tile in which the aesthetic nature of the product is enhanced

SUMMARY OF THE INVENTION

A protective flooring surface is disclosed which provides the protection and cushioning characteristics required, while enhancing the durability and aesthetics of the flooring. The method of manufacturing of the flooring is also disclosed.

A protective flooring tile is disclosed. The protective flooring tile has a durable and water resistant prefabricated top layer which is made of rubber material. The top layer has a top surface and a bottom surface, with the bottom surface having voids which extend from bottom surface toward the top surface. A resilient bottom layer extends from the top surface and is made of granulated rubber. The bottom layer has a prepolymer material provided between the granulated rubber which bonds the granulated rubber together. The prepolymer material flows from the bottom layer into the voids of the top layer during the manufacture of the protective flooring tile to bond the top layer to the bottom layer.

The density of the top layer of the protective flooring tile is greater than the density of the bottom layer, which allows the top layer to provide the water resistant characteristics required for harsh environments. The prefabricated top layer may also have controlled geometric patterns provided therein.

The invention is also directed to a method of manufacturing the protective flooring tile. The method utilizes a molding press which has at least one mold cavity provided thereon. The mold cavity is either preheated or heated as the material is provided therein. Backing material is mixed and poured into the mold cavity. The backing material is generally mixed at room temperature. A prefabricated rubber mat is positioned in the mold cavity on top of the backing material. The prefabricated rubber mat is dimensioned to have larger dimensions than the inside dimensions of the mold cavity, thereby allowing the rubber mat to be compression molded, which facilitates the positioning of the rubber mat on the backing material and helps to insure that the rubber mat will lay flat on the backing material to avoid air pockets forming therebetween. Pressure is applied to the rubber mat and the backing material, causing a prepolymer material of the backing mixture to flow into voids provided on the rubber mat. The heat and pressure are applied for a predetermined time to allow the prepolymer material to vulcanize or cure, thereby insuring that the rubber mat will permanently adhere to the backing material when the protective flooring tile is removed from the mold cavity. Utilizing this method, the rubber mat will expand to conform to the inside dimensions of the mold cavity when the rubber mat is exposed to the heat of the mold cavity.

DETAILED DESCRIPTION OF THE INVENTION

As previously stated, protective flooring is generally known in the industry. These tiles are used in high traffic and impact areas to significantly reduce the likelihood of injuries. The invention described herein is an improved flooring system that provides the protection of previous tiles, as well as other advantages that will be more fully discussed below.

Figure 1:
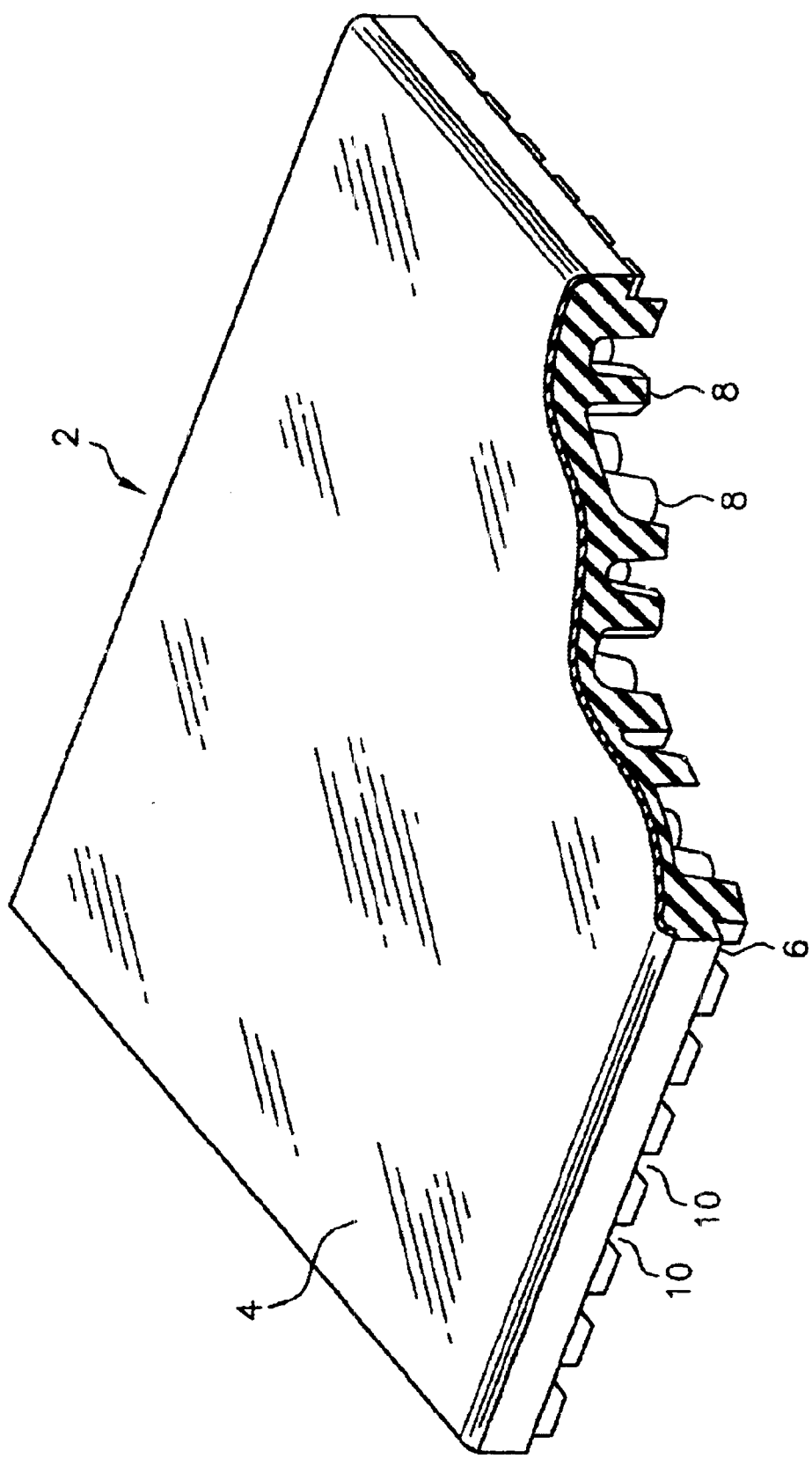
FIG. 1 is a perspective view of a laminated tile according to the present invention.
Figure 2:
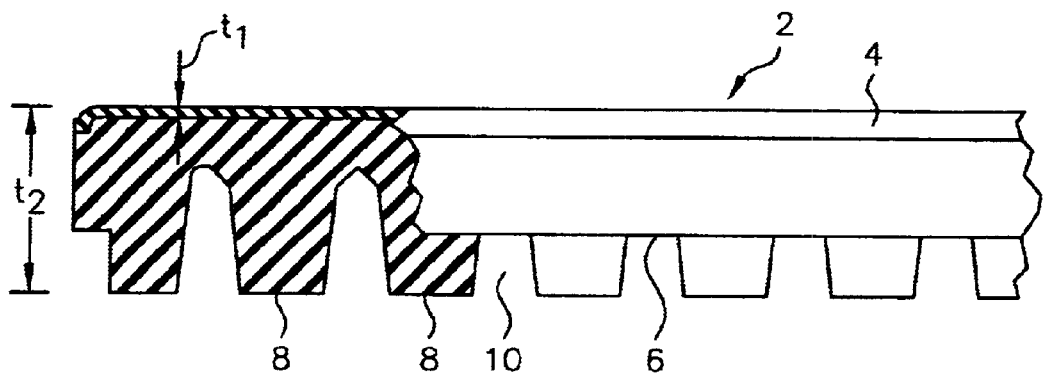
FIG. 2 is a side view of the laminated tile of FIG. 1 with a portion shown in cross section.
Figure 4:
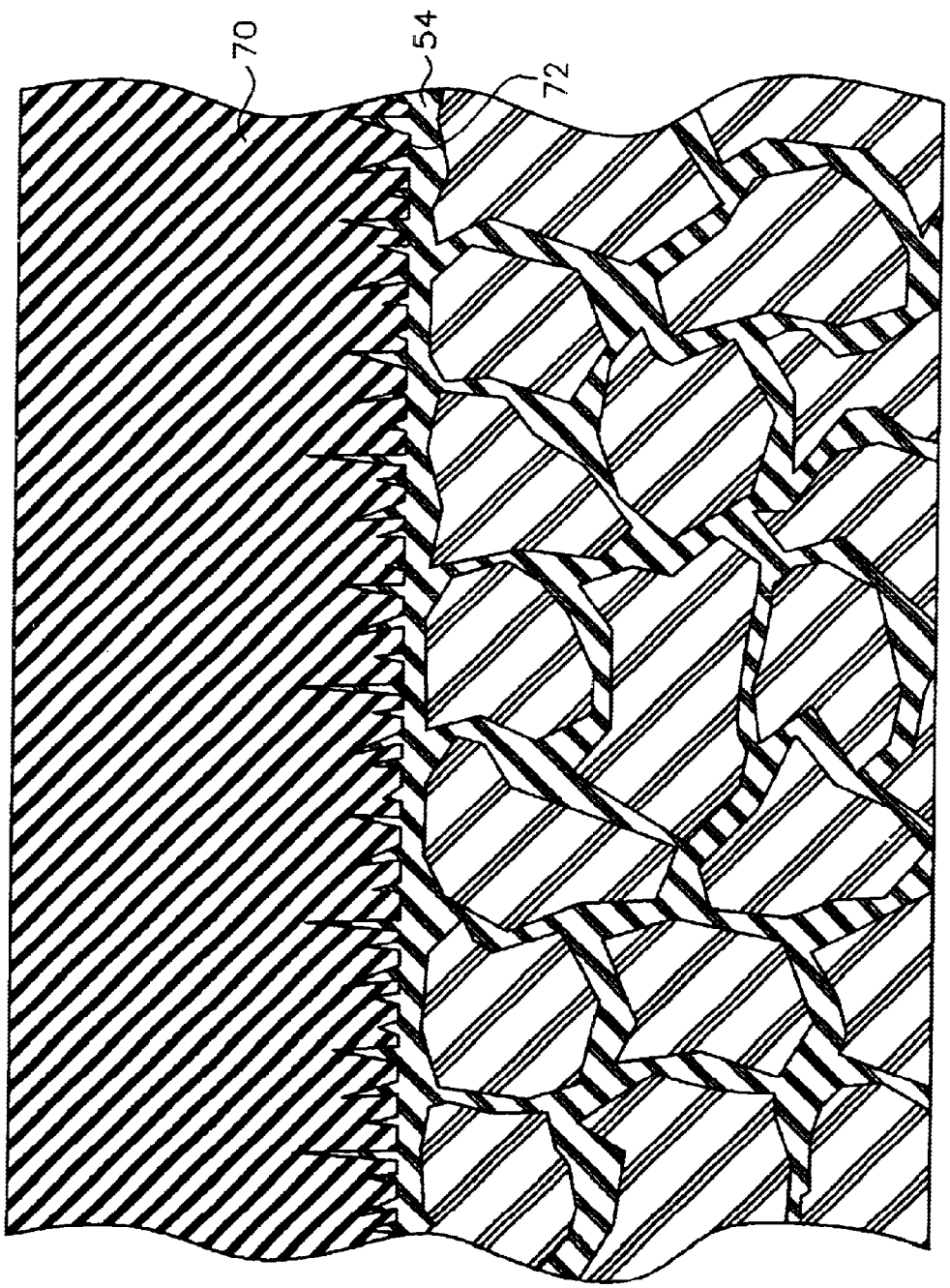
FIG. 4 is an enlarged cross-sectional view of the laminated tile of FIG. 1 showing a top layer bonded to a bottom layer.

The tile 2 of the present invention is best shown in FIGS. 1, 2, and 4. Tile 2 has a top layer 4 and a bottom layer 6. As shown in FIG. 2, the height or thickness $t_1$ of top layer 4 is less than the height or thickness $t_2$ of bottom layer 6. The top layer is an EPDM laminate plaque that is pre-molded, as will be more fully discussed. Although in the embodiment shown the top layer is made of a mixture having a large percentage of EPDM rubber therein, the top layer can be made of EPDM rubber, SBR rubber, other rubbers, or any combination thereof. This top layer 4 has a density and/or porosity that allows it to be more durable and water-resistant than the bottom layer 6. While the density of the top layer can vary greatly, for the embodiment shown, the density is approximately 1300 grams/liter. The top layer has a generally planar configuration with the ends slightly curved, as shown in FIG. 2. As numerous tiles are positioned adjacent to each other to form a flooring surface, the edges will abut against each other. As the edges are slightly recessed, the edges form a channel in which liquids spilled on the top surface of the top layer can flow and gather. This allows the majority of the top surface to stay liquid free, thereby providing the non-skid characteristics desired in environments in which the tiles will be placed (i.e. heavy traffic areas, factory floors, weight rooms, children's playgrounds).

Figure 3:
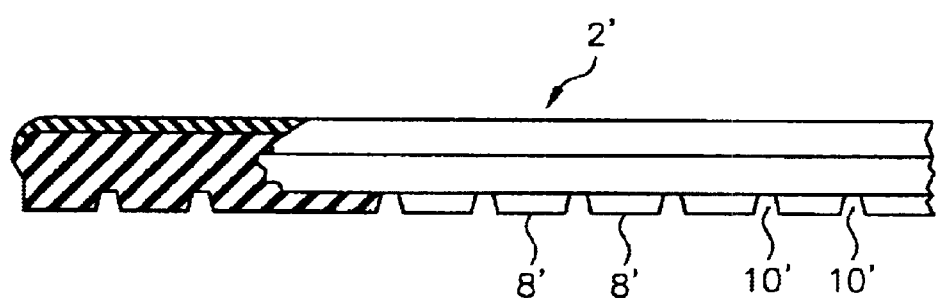
FIG. 3 is a side view of an alternate laminated tile with a portion shown in cross section.

The bottom layer 6 or cushioning, shock absorption layer, is comprised of SBR rubber material made with shredded and cleaned tire rubber. In the embodiment shown, the density of the SBR material is approximately 800 gram/liter, although this can vary depending on the thickness and particular configuration of the bottom layer. As the bottom layer is meant to absorb shock or impact, the density of the bottom layer is less than the density of the top layer. Consequently, more air space is provided between the fibers of the bottom layer and therefore, the cushioning or resiliency of the bottom layer is enhanced. The cushioning is also enhanced by the shape and dimensioning of the bottom layer 6. As is shown in FIGS. 2 and 3, the thickness $t_2$ of the bottom layer can be customized to the particular use or application. In the embodiment of FIG. 2, the bottom layer has a thickness significantly greater than the thickness of the top layer, thereby ensuring that the tile will be highly cushioned. This type of tile is more appropriate in a playground setting, in which children may fall a significant height. Alternately, the thickness of the bottom layer shown in FIG. 3 is closer to the thickness of the top layer, thereby reducing the ability of the tile to cushion against severe falls and impact. This type of tile is more appropriately used in high traffic areas and factory floors.

The bottom layer 6 has projections 8 and recesses 10 which extend therefrom in a direction away from the top layer 4. The shape of the projections 8 and recesses 10 can likewise be varied to increase or decrease the amount of cushioning performed by the tiles. As the dimensions of the recesses are increased, the resiliency or cushioning of the floor is also increased. Therefore, in areas of high impact, i.e. playgrounds, the recesses would be larger than in flooring designed for high traffic areas, where increased durability is desired.

Figure 5:
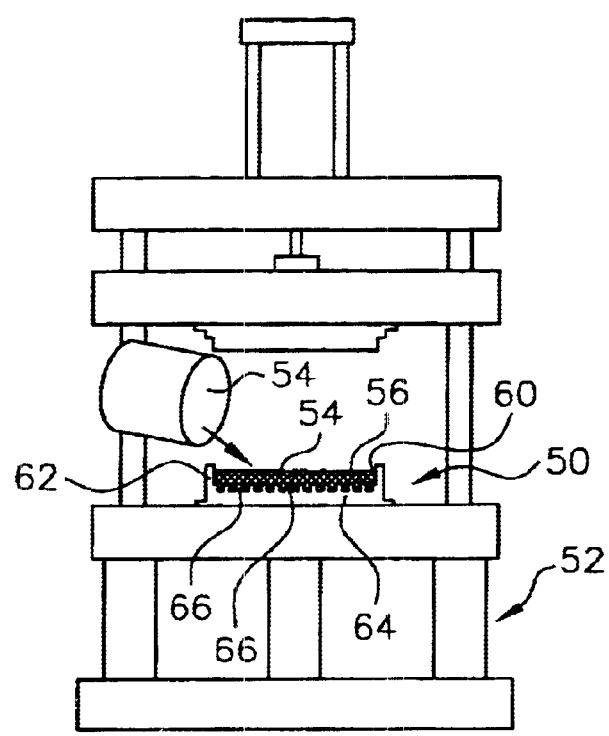
FIG. 5 is a side view of the machinery used to manufacture the laminated tile, showing the material for bottom layer being positioned therein.

Referring to FIGS. 5 through 8, the process of producing the tiles is shown. As shown in FIG. 5, a backing or liquid crumb mixture 54 is poured into a mold 50 on a press 52. The mixture 54 is made of SBR rubber, consisting of shredded and cleaned rubber, mixed with a prepolymer material and water. In one embodiment, the mixture consists of less than ten percent (10%) prepolymer and less than five percent (5%) water, with the remainder of the mixture consisting of recycled shredded rubber. The prepolymer is an Isocyanate and Polyol mixture. The dimensioning of the rubber fibers can be varied according to the particular characteristics desired for the application. In other words, the size and shape of the rubber fibers effects the overall resiliency of the rubber backing and the tile.

The prepolymer, water and rubber are combined and mixed together at room temperature for approximately five (5) minutes (depending on the volume of the mixture) to form the backing or liquid crumb mixture 54. The properties of the mixture allows the mixture to flow when poured into the mold. The mixture will not cure until it is exposed to heat and/or pressure, thereby allowing the operator to properly work with the mixture 54 before it takes a permanent set.

After the mixture 54 is poured into the mold 50, the backing mixture 54 is raked or leveled. This insures that the backing mixture 54 will be distributed uniformly in the mold and that the top surface 56 of the backing mixture will be relatively smooth. The amount of backing mixture 54 poured into the mold is accurately controlled to provide the resilient characteristics desired for the particular tile being manufactured (whether it is a tile for the playground, fitness flooring, commercial flooring, etc.).

As shown in the FIGS. 5 through 8, the mold 50 has an inner cavity 60 that receives the backing mixture 54 therein. The inner cavity 60 has sidewalls 62, end walls (not shown) which extend between the sidewalls, and a bottom wall 64. The bottom wall 64 has projections 66 that extend upward therefrom (when viewed in FIG. 5). The mold projections 66 are provided to displace the mixture 54, such that the mold projections form the recesses 10 of the tile. Consequently, in order to vary the shape of the projections 8 and recesses 10 of the bottom layer 6, the configuration of the mold projections 66 and the spaces provided there between is varied accordingly.

Figure 6:
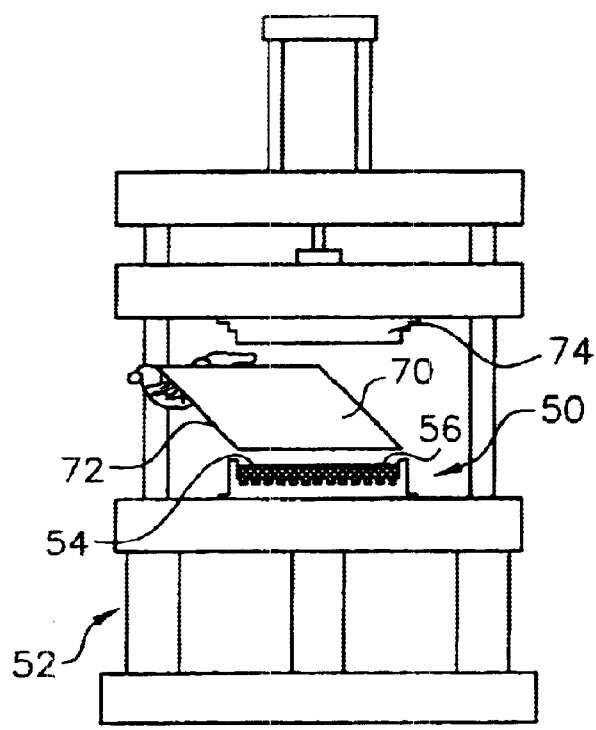
FIG. 6 is a side view similar to FIG. 5 showing the top layer being positioned therein.

Referring to FIG. 6, a free formed piece of EPDM rubber 70 is next positioned in the mold 50. The EPDM rubber 70 is positioned over the covers the backing mixture 54 provided in the mold. As the backing mixture 54 has been leveled, a bottom surface 72 of the rubber 70 is positioned on the top surface 56 of the backing mixture 54, such that the bottom surface 72 and top surface 56 are periodically in engagement along the entire length l and width w of the rubber 70. In this initial position, the bottom surface 72 and top surface 56 have random air voids provided therebetween. The length l and width w of the EPDM rubber 70 is dimensioned to be approximately equal to the length and width of the inner cavity 60 of the mold 50. However, the EPDM rubber has slightly larger dimensions to allow the EPDM rubber to properly fit within the inner cavity and insure that the backing mixture is properly covered. The dimensions of the rubber do not prevent the rubber 70 from lying flat on the top surface 56, particularly around the edges where the rubber contacts the walls of the cavity. In fact, the dimensions of the rubber cause the rubber to be compressed as the mold is closed, which enhances the bonding of the rubber to the backing mixture.

The rubber 70 is premolded and precut for use herein. In the embodiment shown, each prefabricated rubber sheet 70, as well as the cavity 60, is dimensioned to have a square configuration. However, other configurations are possible within the scope of the invention. The EPDM rubber 70 can be molded in various conventional ways. In the embodiment described herein, EPDM rubber, SBR rubber, polyurethane, and a catalyst are combined, mixed together and poured into a cylindrical mold. This mixture is subjected to pressure and allowed to cure over time. The large cured cylindrical rubber is removed from the mold and cut into long sheets of appropriate thickness (3 mm for the embodiment shown). The sheet is then cut to the particular shape required (approximately 24.25 inches by 24.25 inches for the embodiment shown). The prefabricated sheets are represented by the rubber 70 shown in FIG. 6.

Figure 7:
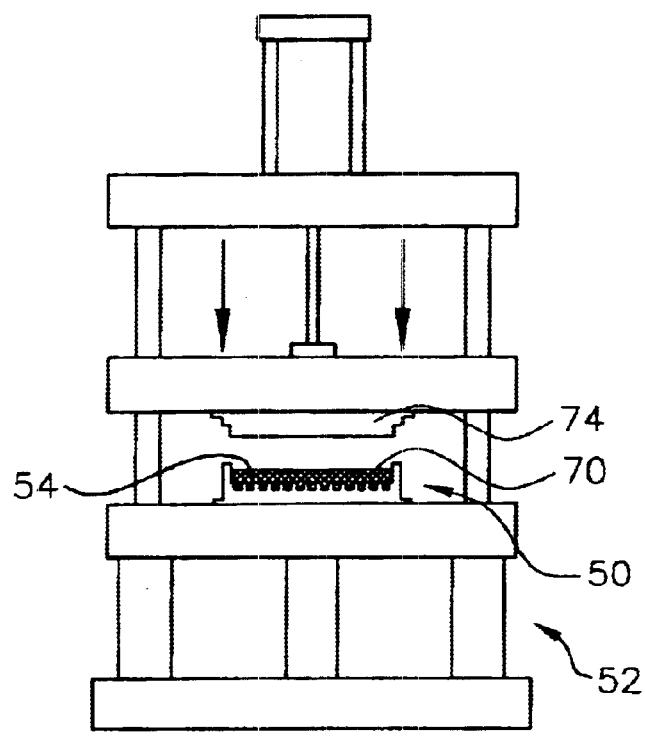
FIG. 7 is a side view similar to FIG. 6 showing the press portion of the machinery closing or moving toward the base with the bottom and top layers in an uncompressed state.

With the backing mixture 54 and EPDM rubber 70 properly positioned in the mold, the press head 74 is moved toward the mold 50, as represented by the arrows shown in FIG. 7. This motion is continued until the press head 74 engages the EPDM rubber and exerts a significant pressure thereon. In the embodiment shown, the press 52 is a ½ ton press. As the press head 74 is moved downward, the rubber 70 and the backing mixture 54 are caused to compress. This causes the rubber to be compressed against the backing mixture thereby eliminating any unwanted pockets of air between the rubber 70 and backing mixture 54. As the materials are compressed, a portion of the prepolymer mixture is forced to flow from the backing mixture 54 toward the rubber 70. As is shown in FIG. 4, the bottom surface 72 of the rubber 70 has voids which extend from the bottom surface 72 toward the top surface of the rubber. As the prepolymer is forced from the backing mixture 54, the prepolymer flows into and is captured in the voids of the rubber 70.

The pressure is applied for approximately twenty minutes. During this time the mold is maintained at a temperature of approximately two hundred degrees Fahrenheit (200 F.). The combination of the pressure and heat causes the prepolymer to cure or solidify. As the prepolymer has flowed into the voids of the rubber 70, and around the rubber, the solidification of the prepolymer provides a secure bond between the rubber 70 and the backing mixture 54. The solidification of the prepolymer also insures that the shredded rubber of the backing mixture 54 will be bonded together.

During the process shown in FIG. 7, it is important that heat be applied to the mold during compression. However, the mold may be continuously heated during the remainder of the process. The heating of the mold during the steps shown in FIGS. 5, 6 and 8 will not cause the prepolymer to solidify prematurely, as it is the combination of the heat and pressure which causes the solidification of the prepolymer over a short period of time.

Figure 8:
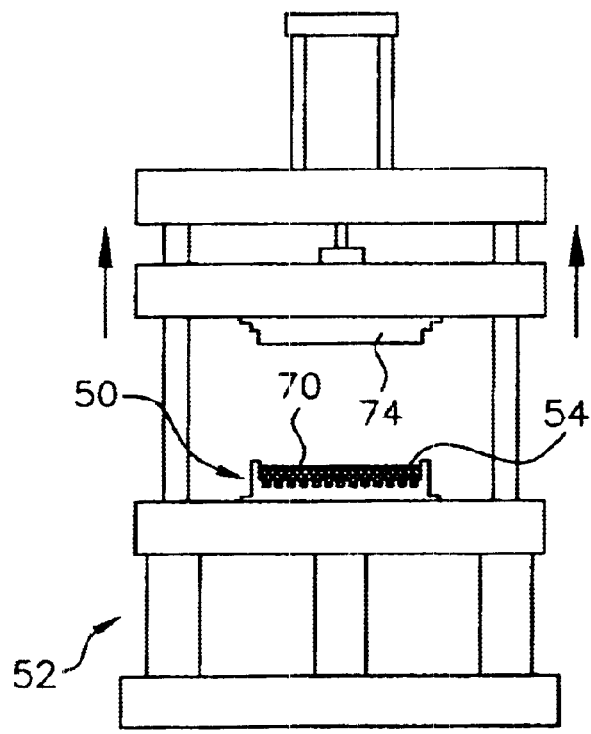
FIG. 8 is a side view similar to FIG. 7 showing the press portion of the machinery opening or moving away from the base, with the bottom and top layers in a compressed state.

At the appropriate time, the press head 74 is moved away from the mold 50 in the direction indicated by the arrows shown in FIG. 8. With the press head removed, the molded tile with the EPDM rubber upper layer bonded to the SBR rubber lower layer is removed. This process is repeated for each tile. In the alternative each press may cooperate with more than one mold at a time, thereby allowing numerous tiles to be made simultaneously.

According to the prior art, tiles of this type are manufactured by placing a backing mixture in the mold, similar to that depicted in FIG. 5. After the backing mixture has been raked, a top layer mixture is poured over the backing mixture. The top layer mixture is raked and the press head is moved into engagement with the top layer mixture. As pressure is applied, the liquid or prepolymer provided in the top layer mixture and the backing mixture flow together. Consequently, as pressure and heat are applied to the mixtures, the prepolymers (which have intermixed) are cured, causing a bond between the top layer and the bottom layer.

While the prior art tile provides sufficient cushioning for respective applications, the tiles produced according to the present invention have several advantages.

The utilization of a prefabricated top layer allows the thickness of the top layer to be more uniform and controlled. As the prefabricated top layer is cut from pre-molded material, the thickness can be controlled. In the prior art, the top layer may have areas in which the thickness of the material was "thin" due to the vagaries of pouring. This could lead to uneven wear of the tiles.

As the thickness of the prefabricated top layer can be more precisely controlled, the thickness of the top layer can be made to be as thick as possible while still maintaining the desired durability and resilient characteristics required. Consequently, material will not be wasted and costs will be reduced by the use of the present invention. Costs will also be reduced as the present invention is less labor intensive. The prefabricated top layer does not require that the materials be mixed at the factory, which is in direct contrast to the prior art. Therefore, the labor costs required to manufacture the present invention are reduced.

The present invention is also susceptible to ultra-violet (UV) radiation. In the prior art, the prepolymer present in the top layer mixture would flow during forming and create a thin polyurethane film on the top surface of the top layer. Over time, this film yellows as it is exposed to UV radiation. Consequently, the appearance of the prior art tiles is diminished over time. In contrast, the prefabricated top layer does not have a film provided on the top surface thereof. Although a prepolymer material is used when the rubber 70 is manufactured, the prepolymer does not form a thin film on the top surface of the top layer. As the long sheets are cut from the mold (as previously described), they cut through the shredded rubber and the prepolymer. Therefore, shredded rubber is directly exposed on the top surface. As the appearance of the rubber will not be "clouded" from the yellowing of the prepolymer, the appearance of the tiles made according to the invention herein claimed will not degrade due to UV exposure. Also, as the rubber is much less susceptible to UV damage than the prepolymer, the structural integrity of the present invention is enhanced.

In addition, the use of a prefabricated top layer allows for many more options to enhance the aesthetics of the tiles. As the prior art requires the top layer mixture to be mixed on site and poured into the mold, the opportunity to control the positioning of the shredded rubber does not exist. In other words, the top layer mixture is a mixture with randomly positioned shredded rubber provided therein. As the positioning is random, the use controlled geometric shapes and colors was impossible. However, geometric shapes and colors can be controlled and used in the present invention. The prefabricated top layer is manufactured in such a manner so that geometric shapes and vibrant colors can be used and controlled. Therefore, as the rubber sheets are cut, the top surface of the top layer will have geometric patterns and colors exposed thereon. When the prefabricated top layer is bonded to the bottom layer, the top surface will be exposed, so that the aesthetics of the tiles will be significantly enhanced over the prior art tiles.

The durability of the tiles of the present invention is also enhanced. As the density of the prefabricated top layer is greater than previously obtainable, the top layer will be less porous. As less liquid will be able to penetrate the tile, the durability of the tile over time will be enhanced. This also allows the tile to be used in environments not previously considered acceptable (i.e. restaurants).

The foregoing description illustrates some of the alternatives for practicing the invention. Various other embodiments are possible without departing from the scope and spirit of the invention. It is, therefore, intended that the foregoing description be regarded as illustrative rather than limiting, and that the scope of the invention is given by the appended claims together with their full range of equivalents.

What is claimed is:

1. A protective flooring tile comprising:

a durable and water resistant prefabricated top layer made of rubber material, the top layer having a top surface and a bottom surface, the bottom surface has voids which extend from the bottom surface toward the top surface;

a resilient bottom layer made of granulated rubber, the bottom layer having a prepolymer material provided between the granulated rubber to bond the granulated rubber together;

wherein the prepolymer material flows from the bottom layer into the voids of the top layer during the manufacture of the protective flooring tile to bond the top layer to the bottom layer.

2. The protective flooring tile as recited in claim 1 wherein the prefabricated top layer has a density which is greater than the density of the bottom layer, the density of the top layer in configured to provide the water resistant characteristics required for harsh environments.

3. The protective flooring tile as recited in claim 2 wherein the density of the top layer is approximately 1300 grams per liter.

4. The protective flooring tile as recited in claim 3 wherein the density of the bottom layer is approximately 800 grams per liter.

5. The protective flooring tile as recited in claim 1 wherein the prefabricated top layer has controlled geometric patterns provided therein.

6. The protective flooring tile as recited in claim 1 wherein the bottom surface has projections and recesses provided on a lower surface thereof, the projections and recesses enhance the resilient characteristics of the protective flooring tile.

7. The protective flooring tile as recited in claim 1 wherein edges of the top surface of the top layer extend in a direction toward the bottom surface thereof, the edges combine to form a channel when the flooring tile is moved into engagement with a mating flooring tile.

8. The protective flooring tile as recited in claim 1 wherein the top layer is made from an EPDM laminate material.

9. The protective flooring tile as recited in claim 1 wherein the bottom layer is made from a SBR rubber material.

10. A protective flooring tile comprising:

a durable top layer made of a pre-formed piece of rubber; and a resilient bottom layer made of rubber and a pre-polymer material positioned adjacent to a bottom surface of the top layer, the bottom layer has a lower density than the top layer and has projections and recesses that extend away from the top layer that control the amount of cushioning performed by the protective flooring tile.

11. The protective flooring tile as recited in claim 10 wherein the top layer has a thickness less than the bottom layer.

12. The protective flooring tile as recited in claim 10 wherein the bottom surface of the top layer has voids that receive the pre-polymer material to bond the bottom layer to the top layer.

13. The protective flooring tile as recited in claim 10 wherein the density of the top layer is approximately 1300 grams per liter.

14. The protective flooring tile as recited in claim 13 wherein the density of the bottom layer is approximately 800 grams per liter.

15. The protective flooring tile as recited in claim 10 wherein edges of a top surface of the top layer extend in a direction toward the bottom surface thereof, the edges combine to form a channel when the flooring tile is moved into engagement with a mating flooring tile.

16. The protective flooring tile as recited in claim 10 wherein the top layer is made from an EPDM material and the bottom layer is made from a SBR material.

\* \* \* \* \*